United States Patent [19]

Pennewiss et al.

[11] 3,865,619

[45] Feb. 11, 1975

[54] ANTI-FOGGING HYDROPHILIC RESIN COATINGS

[75] Inventors: Horst Pennewiss, Darmstadt-Neu-Kranichstein; Hermann Plainer; Waldemar Schleier, both of Darmstadt, all of Germany

[73] Assignee: Rohm GmbH, Darmstadt, Germany

[22] Filed: Dec. 11, 1972

[21] Appl. No.: 313,813

[30] Foreign Application Priority Data
Dec. 11, 1971 Germany............................ 2161645

[52] U.S. Cl................. 117/138.8, 106/13, 117/124, 117/161
[51] Int. Cl............................................... B44d 1/09
[58] Field of Search.... 106/13; 117/161 UA, 124 E, 117/138.8 DA; 252/70; 15/104.93

[56] References Cited
UNITED STATES PATENTS

| 3,294,726 | 12/1966 | Wyner | 117/124 E X |
| 3,437,617 | 4/1969 | Bogle | 117/138.8 UA |
| 3,488,215 | 1/1970 | Shepherd | 117/161 UC |
| 3,515,579 | 6/1970 | Shepherd | 260/45.75 R |
| 3,597,384 | 8/1971 | Kugler | 117/124 E X |
| 3,625,741 | 12/1971 | Stoy | 117/138.8 UA |
| 3,745,042 | 7/1973 | Lim | 117/138.8 A |
| 3,779,792 | 12/1973 | Stoy | 117/124 E |

Primary Examiner—William E. Schulz
Attorney, Agent, or Firm—Curtis, Morris & Safford

[57] ABSTRACT

The method of forming an anti-fogging coating on an optical surface by applying a solution of a hydrophilic film-forming resin in a water-miscible organic solvent to said surface to form a coating thereon and then drying and hardening said coating, said hydrophilic resin comprising:

(a) an ethylenically unsaturated polymerizable monomer having a salt-forming or salt group therein;
(b) at least one monomer which is an ester formed between acrylic acid or methacrylic acid and an alcohol having 1 to 4 carbon atoms, the monomer or monomer mixture forming by itself a polymer or copolymer having a $T_{\lambda max}$-value between 30°C. and 80°C.; and
(c) an optional cross-linking component; including the step of neutralizing salt-forming groups, if present in component (a), after formation of the coating, to form salt groups therefrom;

said resin, in the form of a layer 30 to 50 microns thick, swelling in water at 20°C. within 3 minutes to a volume 20 to 300 percent greater than its original volume.

An optical surface having such an anti-fogging coating thereon.

7 Claims, No Drawings

ANTI-FOGGING HYDROPHILIC RESIN COATINGS

The present invention relates to a method for hindering the fogging of optical surfaces by the application of certain hydrophilic resin coatings thereto, and to such coated optical surfaces.

Hydrophilic resin coatings which protect optical surfaces, i.e. surfaces which reflect and/or transmit light, from fogging, i.e. from the accumulation thereon of discrete liquid droplets of, for example, condensed atmospheric moisture, are known in the art, for example from German Offenlegungsschrift 1,928,409 (U.S. Pat. No. 3,488,215). Basically, they comprise hydroxyalkyl esters of acrylic acid or methacrylic acid together with optional comonomers having carboxy groups or amino groups, and are preferably cross-linked. Non-cross-linked or weakly-cross-linked coatings of this kind have a high capacity for absorbing water and, in certain cases, the ability to spread excess water — after complete saturation thereof with water — on their surface as a uniform film which does not hinder vision. The disadvantage of these coatings is their low resistance to scratching and their low adhesion. In a swollen condition they can be irreversibly damaged even by light wiping with a finger, or can be dissolved off their substrate. These deficiencies can be improved by greater cross-linking, but at the same time water-absorbing capacity is decreased. The ability of the materials to spread water on the saturated surface is also completely lost.

It is further known from German Offenlegungsschrift 2,111,374 to equip glasses with a condensation-free coating comprising a hydrophilic polymeric salt as the effective component. In this case, one ion of the salt is covalently bound to the polymeric structure, and the counter-ion is free. The necessary resistance to scratching can be provided by a subsequent cross-linking. However, the adhesion of the coating to glass is influenced thereby. This disadvantage is counteracted by providing the glass with a glass-adherent, less-hydrophilic, underlayer which acts as a bonding agent.

An object of the invention is so to improve the relationship between the mechanical strength and the water-absorbing capacity of resins suitable for use as anti-fogging coatings so that with a single layer coatings having good adherence, scratch resistance, and sufficient water absorption, as well as coatings which will strongly take up water, spread non-absorbed water, and have sufficient scratch resistance, can both be prepared.

One feature of the present invention is the discovery that an optimum balance between water-absorption capacity, adhesion, and resistance to scratching of a resin is related to a certain swelling behavior and to certain limiting values of the content in the resin of non-hydrophilic comonomers which respectively impart hardness or softness thereto.

According to one aspect of the invention, light-reflecting or light-transmitting surfaces of objects such as glass, plastic, or metal are coated with an anti-fogging agent which is a solution, free of pigments and fillers, of a film-forming hydrophilic resin containing salt-like groups. The resin, which may or may not be cross-linked, comprises:

(a) 12 to 30 percent by weight of an ethylenically unsaturated polymerizable monomer having a salt-forming or salt group therein;

(b) 40 to 88 percent by weight of one or more alkanol esters of acrylic acid and/or methacrylic acid, said esters having from 1 – 4 carbon atoms in the alcohol portion thereof, optionally together with other, different, polymerizable monomers in amounts of up to 10 percent by weigth of the polymer, this monomer or monomer mixture being such that a homopolymer or copolymer of this component alone has a $T_{\lambda\,max}$-value between 30°C. and 80°C.; and (c) 0 to 50 percent by weight of a cross-linking component.

The salt-like monomer (a) and the optional cross-linking component (c), if the latter is present, are present in amounts within the limits given above such that the dried or cross-linked resin, in a coating thickness of from 30 to 50 microns, will swell in water at 20°C. within three minutes by an amount which is 20 – 300 percent of its original volume. The percent of swelling under these conditions of time, temperature, and thickness is defined herein as the "swelling value," Q.

Resins having a swelling value of about 20 percent are characterized by a relatively high hardness and resistance to scratching, even in the swollen condition, and are therefore suitable as coatings for eyeglasses, particularly ski goggles or motorcycle goggles, for vehicle windshields, dental mirrors, and the like. In contrast, coatings having a swelling value of 200 percent or more are relatively soft coatings on which water will spread. These can be used in cases in which there is no danger of a mechanical demand being made on the coating, for example on the interior of lenses for vehicle headlights or in the interior of double paned arrangements, such as windows, which are not hermetically sealed. In those cases in which a mechanical demand made on the surface arises only exceptionally, or when minor damage to the layer can be tolerated, a resin having an intermediate swelling value, for example in the range from 80 to 150 percent, can be chosen depending on the conditions of use. For example such resins could be used to coat the glazing of greenhouses, as picture windows, on bathroom mirrors, and the like.

The monomers having salt groups can either be salts of polymerizable carboxylic or sulfonic acids, salts of polymerizable amines, or quaternary ammonium salts. Preferred materials include the salts of α-β-unsaturated aliphatic mono- and di-carboxylic acids, particularly salts of those acids having 3 – 5 carbon atoms, such as salts of acrylic acid, methacrylic acid, maleic acid, fumaric acid, and itaconic acid. Salts of half-esters of the aforementioned dicarboxylic acids, particularly of esters formed with $C_{1-8}$ alkanols, as well as salts of vinyl sulfonic acids or of methacryl taurines are suitable. Salts of acrylic acid and methacrylic acid are preferred.

As cations, those of the alkali metals are preferred, as well as those of the alkaline earth metals, of amines such as trimethylamine, tributylamine, mono-, di-, and tri-ethanolamine, and diethylamine, or of ammonium and alkyl-ammonium. In many cases it is advantageous to neutralize salt-forming carboxy groups or sulfonic acid groups of a resin according to the invention only after the resin has been applied as a layer and optionally hardened. For this purpose the resin is treated with an aqueous solution of an alkali metal hydroxide or alkaline earth metal hydroxide, or with an amine or a basic ammonium or alkyl-ammonium compound. In general, the base used for neutralization of resin acid groups is not critical to the invention.

As preferred salts of polymerizable amines, the chloride, sulfate, methosulfate, acetate, phosphate, etc. of vinyl pyridine or of the aminoalkyl esters and aminoalkyl amides of $\alpha,\beta$-unsaturated carboxylic acids, such as dimethylaminoethyl-acrylate or -methacrylate, benzylaminoethyl-acrylate or -methacrylate, piperidinoethyl- or morpholinoethyl-aerylate or -methacrylate, etc., can be mentioned. In this case also it is possible to neutralize salt-forming basic groups in resins containing these amines with acids only after formation of the coating. Again, the particular acid employed is not critical to the invention.

Polymerizable quaternary ammonium salts are employed to particular advantage as component (a). Such compounds can be derived from the aforementioned aminoalkyl esters or aminoalkyl amides of acrylic acid or methacrylic acid, for example, and include silane derivatives thereof.

Particularly preferred amines, salts, and quaternary ammonium compounds are acrylic and methacrylic compounds of the formulas

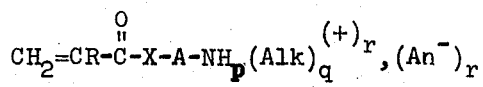

and

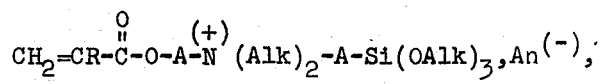

wherein R is hydrogen or methyl; X is oxygen or —NH; A is alkylene having 2 to 4 carbon atoms; Alk is alkyl having 1 to 8 carbon atoms; $An^-$ is one equivalent of an anion; $p = 0$, 1, or 2; $r = 0$ or 1; and $q = 2 + r - p$.

The composition of component (b) is selected such that a polymer prepared from this component alone has a softening temperature, or temperature of the damping maximum in the torsion swing test according to DIN 53 445, ($T_{\lambda\ max}$-value) from 30°C. – 80°C. If the softening temperature is above this value, the danger arises that the coating in its dry condition will adhere poorly to the substrate. If the softening temperature is below this value; the coating as a whole is too soft, particularly when swollen.

One monomer that meets the aforementioned conditions when used alone is butylmethacrylate. The other esters of acrylic acid and methacrylic acid are generally employed in certain combinations, for example methyl methacrylateethyl acrylate, or methyl methacrylate-butyl acrylate. Esters of acrylic acid and methacrylic acid having more than four carbon atoms in the alcohol portion, or styrene, act hydrophobically and for this reason should be used in synthesizing the resin in only small amounts not exceeding 10 percent of the resin weight. These limitations on amount are also applicable to less hydrophobic comonomers, such as acrylonitrile or methacrylonitrile.

German Offenlegungsschrift 2,111,374 mentions only acrylonitrile, methacrylonitrile, or styrene as co-monomers in addition to those having salt-like groups in the coating agents there taught. The homopolymers of these monomers have $T_{\lambda\ max}$-values above 100°C. As a result, the coating agents, even when weakly cross-linked, adhere so badly to glass that an underlayer with a bonding agent is essential. In contrast, coatings of a resin according to the present invention adhere to glass and plastic so well that a bonding agent can be dispensed with.

Cross-linking component (c) can, together with the monomers mentioned under (a) and (b), be part of an at least ternary copolymer. However, the resin of the invention can contain cross-linking component (c) as an independent component in addition to a copolymer of (a) and (b). Finally, embodiments in which component (c) comprises several constituents, of which one or several form a copolymer with monomers of the component (a) and (b), while the remaining portion of component (c) is present as an independent constituent in the resin, are also contemplated.

The cross-linking component limits the swellability of the coating in water. The amount of the cross-linking component present in a particular case depends on three factors: (a) on the desired swelling value under given test conditions; (b) on the amount and the hydrophilicity of the salt-group monomers; and (c) on the efficacy of the cross-linking agent under the hardening conditions.

In the non-cross-linked condition, the resin layer swells in more water the greater the portion of salt groups and may go into solution. With low contents of salty monomer units, a weak cross-linking is sufficient in order to limit swellability to a desired value. At higher contents of salt groups, the material must correspondingly be more strongly cross-linked. Strongly hydrophilic salt groups, such as quaternary ammonium salt groups or alkali carboxylate groups, require a stronger cross-linking than weakly hydrophilic groups such as ammonium carboxylate groups in order to reach the same swelling value. Under certain circumstances, cross-linking can be dispensed with altogether if the salty monomer — particularly a weakly hydrophilic monomer — is present in very small amounts and a swelling value of 200 percent is not exceeded in the non-cross-linked state. In many cases, such a low degree of cross-linking that the cross-linked coating agent is still soluble in alcohols and similar solvents is sufficient. More exactly, the matter is one of branching. In this case cross-linking can occur even during polymerization, for example by the introduction of compounds having several polymerizable double bonds, such as diacrylates or dimethacrylates of glycols or divinyl benzene.

Stronger cross-linking leading to insolubility in alcohols and similar solvents can only be brought about by a subsequent hardening of the coating. A large number of known systems is available for this purpose. Their efficacy is so well known from the technology relating to heat-hardenable coatings, to adhesives, and to casting resins, that they need not be exhaustively described. If the desired swelling value of the coating is fixed, as is the kind and amount of the salty component, it can easily be determined by means of a few orientation tests what amount of cross-linking component is necessary in a particular case to bring the swelling value to the desired level. In many cases, a variation in the hardening conditions, particularly in the hardening temperature, offers a further parameter with which the swelling value can be influenced, proceeding from a particular composition of the resin. An increase in the time and in the temperature of the cross-linking reaction increases the degree of cross-linking and the swelling value correspondingly decreases. One skilled in the art can, with a single coating agent, encompass a broad range of swelling values between the limits of 20 and 200 percent by a corresponding variation of the hardening conditions. (This possibility is limited only if the substrate to be coated cannot be exposed to all possible hardening temperatures. This is often the case for synthetic resins, particularly when they are thermoplastically deformable.)

Preferred cross-linking components for the coatings of the invention include the N-methylol compounds and the N-methylol ethers of acrylamide or of methacrylamide. These have the general formula $CH_2=CR-CONHCH_2-OR'$, wherein R is hydrogen or methyl and R' is hydrogen or, preferably, alkyl. These hardening agents can be even more improved by combination thereof with catalytic amounts of unsaturated polymerizable carboxylic acids, such as acrylic acid or methacrylic acid, which catalyze the hardening reaction; and/or by combination with acrylamide or methacrylamide; and/or by combination with up to an equivalent amount of hydroxyalkyl esters of the aforementioned acids, such as 2-hydroxyethyl methacrylate, 4-hydroxybutylacrylate, or 2-hydroxypropyl-acrylate or -methacrylate, which latter enter into a cross-linking reaction with units of the methylol or methylol ether amide compounds. In this case, all of the named components form a copolymer with components (a) and (b).

The hardening (cross-linking) temperature for such a resin which is from 100°C. – 150°C., can be reduced to from 70°C. – 80°C. in the presence of HCl, used as a supplemental catalyst and not bound to the copolymer. The total amount of the cross-linking component is, in the aforementioned case, preferably from 2 – 30 percent by weight. However, this does not preclude the possibility of using an amount of the component above or below these limits.

When the aforementioned N-methylol and N-methylol ether compounds are present alone (or with catalytic acids), the resins in which they are present are self-cross-linking, i.e. these comonomers react with each other to form cross-links. When the comonomers are combined with acrylamide, methacrylamide, or the aforementioned hydroxyalkyl esters, the reactants combine pairwise to form cross-links.

Further self-cross-linking monomers are compounds of the formula

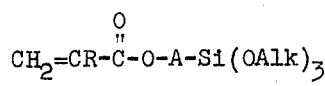

wherein R is hydrogen or methyl, A is alkylene having 2 to 4 carbon atoms, and OAlk contains 1 to 4 carbon atoms.

When component (a) of the copolymer includes a quaternary ammonium alkyl-alkoxy-silane compound, i.e.

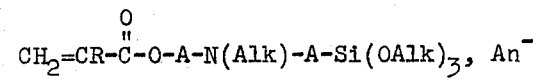

as defined above in connection with this component, self-cross-linking can occur in the presence of traces of water or acid by hydrolytic reactions forming —Si—O—Si— bonds.

Other cross-linking systems employing reactant pairs are those containing, as a first reactive component, acrylamide or methacrylamide, acrylate or methacrylate esters of hydroxy-alkanols having 2 – 6 carbon atoms in the alkyl portion thereof, and compounds of the formula

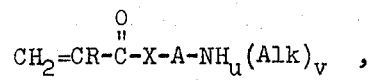

wherein R is hydrogen or methyl; X is oxygen or —NH; A is alkylene having 2 to 4 carbon atoms; Alk is alkyl having 1 to 8 carbon atoms; $u$ is 0 or 1; and $v = 2 - u$.

As a second component coreactive therewith, etherified amine-formaldehyde resins, such as the reaction products of urea, melamine, triazine, or guanidine with formaldehyde, etherified with a $C_1 - C_4$ alcohol, and poly(chloracetic acid) esters of polyols, particularly the polyesters of polyhydroxy polymers and the bisesters of glycols, preferably glycols having 2 to 6 carbon atoms, can be mentioned.

As exemplary of cross-linking components which form a completely independent portion of the resin, in addition to the copolymer formed between components (a) and (b), polyepoxy compounds can be mentioned, e.g. a copolymer of glycidyl methacrylate and butyl methacrylate. These compounds react with carboxy groups of the copolymer with formation of $\beta$-hydroxyester groups. This cross-linking reaction is catalyzed by amines.

Other suitable cross-linking components are monomers containing hydroxy groups, such as glycol monomethacrylate; polyisocyanates; monomers with tertiary amino groups, such as dimethylaminoethyl methacrylate; difunctional quaternizing agents, such as glycol-di-(chloroacetate); monomers containing azlactone groups, such as isopropenyl-4,4-dimethyloxazolone; and primary diamines or polyamines.

In principle, every known cross-linking system which reacts at an elevated temperature can be employed if other given conditions in a particular case are correspondingly observed. Cross-linking by the autooxidation of alkoxyalkyl acrylates or alkoxyalkyl methacrylates with atmospheric oxygen or peroxide in the presence of siccatives takes place even at room temperature. In particular cases, side reactions of a reactive group of the cross-linking system with the solvent used for the resin must be avoided, for example in the case of isocyanates, azlactones, or epoxides dissolved in alcohols. These side reactions can be suppressed by a different choice of solvent; by the use of temperatures, for coating and for the evaporation of the solvent, at which the reactions do not occur or occur only slowly; or by permitting a catalyst to operate after evaporation of the solvent, e.g. alcohol. These side reactions are less harmful if the functional groups are present in a sufficient excess.

For the application of the film-forming resins to form the anti-fogging coatings of the invention, the resins are suitably dissolved in a volatile organic solvent, i.e. one having a normal boiling point below about 160°C., which solvent is miscible with water, i.e. can be mixed with at least an equal amount of water without phase separation. Such solvents include aliphatic alcohols, acetone, methyl ethyl ketone, methyl isobutyl ketone, dimethylformamide, acetonitrile, $\beta$-methoxy-ethanol, dioxane, and tetrahydrofuran, for instance. Alcohols having not more than four carbon atoms, particularly isopropyl alcohol and ethyl alcohol, are preferred.

It is suitable to prepare the copolymer from components (a) and (b), and optionally (c), directly in solution in such a solvent and, where necessary, to combine the polymer with component (c) or a portion thereof prior to use.

The resin concentration in such solutions is preferably from 10 – 40 percent (solids content). For dip-coating, the viscosity of the solution should be between 5 and 200 centipoises. The addition of a few percent of a high-boiling solvent improves optical clarity in the coating and simultaneously brings about an improved adhesion if synthetic resins are being coated.

The layer thickness to be formed depends strongly on the requirements of the end use. With an increasing layer thickness, the water-absorption capacity increases. If high water absorption and high resistance to scratching are desired, a thick layer of about 100 microns of a coating having a low swelling value is employed. Where there is no need for mechanical strength, thin layers of, for example, 10 microns of a material of high swelling value are more economical. If only light fogging is to be inhibited, for example in eyeglasses, thin layers with a relatively low swelling value are sufficient.

The coating is suitably applied by spraying or dipping. In order to assure good optical purity, moisture should be avoided until drying and hardening are complete. Drying is suitably effected at 0°C. – 70°C. and hardening at 70°C. – 160°C. according to the desired degree of swelling. Slow drying is advantageous to film quality. The speed of drying can be influenced by working in an atmosphere which is fortified with vapors of the solvent.

In addition to the anti-fogging effect, in many cases an anti-static effect is concurrently provided.

The following examples illustrate the reciprocal balancing of the amount of salt groups with the kind and amount of the cross-linking component and the hardening conditions for several typical cases. The values mentioned in the Examples are illustrative and are not to be taken as setting limits on the variation of the individual parameters.

For determination of the swelling value (water uptake in 3 minutes of a hardened coating from 30 – 50 microns thick in the dry condition at 20°C.), one proceeds as follows: an amount of a solution of the antifogging resin which, after drying will form a film from 0.1 – 0.5 mm in thickness, is poured into a Petri dish of known weight. The layer is dried in a stepwise fashion, first at room temperature in air, then in vacuum, to constant weight. The film is then hardened under conditions which have been predetermined by tests carried out on thinly-coated plates. The Petri dish with the hardened film is then weighed and subsequently stored for 3 hours at 20°C. in distilled water. Then the Petri dish is thoroughly dried, the swollen film therein carefully dabbed off, and the dish and film weighed. After subtraction of the weight of the Petri dish, the weight of the film before and after swelling is known and the swelling value Q is determined in percent according to the formula Q = increase in film weight/weight of the dry film × 100.

To avoid weighing errors, the swelling can also be determined on a carrier-free film. For this purpose, a Petri dish impregnated with a sodium chloride solution is employed and the aforementioned procedure is followed. After contact with water, the film can be removed from the dish. The film is dried for a short period between absorbent paper, weighed, dried to constant weight, and weighed again. The increase in weight on swelling is derived from the weight of the film before and after drying. The swelling value, Q, is again calculated using the aforementioned formula.

For a rough determination of the swelling value, a micrometric measurement of film thickness before and after contact with water suffices. In this case, Q(%) = Increase in thickness/Dry film thickness × 100.

A better understanding of the invention and of its many advantages will be had by referring to the following specific examples given by way of illustration. In the Examples, all parts are by weight.

EXAMPLE 1

A mixture of
- 30 parts of methyl methacrylate,
- 23 parts of n-butylacrylate,
- 15 parts of $\beta$-hydroxy-n-propylacrylate,
- 10 parts of N-(isobutoxymethylene)-methacrylamide,
- 20 parts of N-trimethyl-($\beta$-methacryloxy)-ethylammonium chloride, and
- 2 parts of methacrylic acid is continuously added, together with 50 parts of n-butanol and 50 parts of isopropanol, over a period of four hours, to a solvent mixture of 150 parts of n-butanol and 150 parts of isopropanol. The receiver is kept at a temperature of 90°C. 0.5 part of t-butylperoctoate as an initiator is present in the receiver, 1 part is present in the monomer mixture run into the flask, and a further 0.5 part is added 1 hour after all of the monomer mixture has been added. After a total of 12 hours, the polymerization is concluded. The Brookfield viscosity of the solution is 20 centipoises (spindle 1; 60 rpm; 20°C.). In this copolymer, the ester component (methyl methacrylate/butyl acrylate) is such that a copolymer prepared alone therefrom would have a T$_{\lambda\ max}$-value of 42°C.

By a simple dipping process, the polymer solution is applied to a polycarbonate sheet, the layer being uniformly distributed by turning motions. After a slow, 5-hour long, drying in air, the coated sheet is heated for 16 hours at 120°C. The layer thickness after a single dipping is about 20 – 30 microns.

As a result of the relatively large layer thickness, the hydrophilic film has a large capacity for the uptake of condensed water. A spreading of applied water drops is not observed: in contrast, they quickly flow off. The resistance to abrasion in the moist condition is good. The film, when used on the inner side of a ski goggle, remained continuously free of fog. The swelling value, Q, is 100 percent.

EXAMPLE 2

A copolymer comprising
- 46 parts of methyl methacrylate,
- 25 parts of n-butyl acrylate,
- 6 parts of $\beta$-hydroxy-n-propylacrylate,
- 4 parts of N-(methoxymethylene)-methacrylamide,
- 16 parts of N-trimethyl-($\beta$-methacryloxyethyl)-ammonium chloride, and
- 3 parts of methacrylic acid is prepared in 400 parts of ethanol as in Example 1 using 2.5 parts of t-butyl peroctoate. The Brookfield viscosity is 14 centipoises (spindle 1; 60 rpm; 20°C.). The $T_{\lambda\,max}$-value of a copolymer of 46 parts of methyl methacrylate and 25 parts of n-butylacrylate is 63°C.

(a) 2.5 parts of concentrated sulfuric acid and 25 parts of dimethylformamide are added to 500 parts of the polymer solution so obtained. An acrylate glass sheet is coated with this solution as in Example 1. After 3 hours of drying in an atmosphere containing ethanol and a further 13 hours' baking in air, the film has a high surface hydrophilicity: it is moistenable with water and is able, after a short period of fogging over (hydrophilicity increases with water uptake), to spread condensed water droplets. Resistance to abrasion and to water are relatively small, so that the use of this layer is recommended only if it is protected against mechanical stresses. The swelling value, Q, of this film is 300 percent.

(b) The film prepared according to (a) above is heated for 1 hour at 70°C. In addition to a good capacity for water uptake, it possesses sufficient resistance to wiping in the moist, swollen, condition. The swelling value, Q, is 150 percent.

(c) The film prepared according to (a) is baked for 14 hours at 70°C. Absorption of water takes place relatively slowly and reliable anti-fogging occurs only after a long swelling. At the same time, resistance to abrasion and to water are outstanding. The swelling value, Q, of this film is 100%.

EXAMPLE 3

A copolymer comprising:
27.5 parts of methyl methacrylate,
27.5 parts of n-butyl acrylate,
15 parts of β-hydroxyethyl acrylate,
10 parts of iso-butoxy methylene-methacrylamide, and
20 parts of methacrylic acid is prepared according to the method described in Example 1 in 200 parts of isobutanol and 200 parts of isopropylglycol using 3 parts of t-butyl peroctoate. The Brookfield viscosity was 135 centipoises (spindle 1; 6 rpm; 20°c.). A copolymer prepared from the ester components (methyl methacrylate/butyl acrylate) would have a $T_{\lambda\,max}$-value of 32°C.

The copolymer is applied to a polycarbonate sheet as described in Example 1 and baked for 16 hours at 130°C. The 30 – 40 micron thick sheet was made hydrophilic on its surface by neutralization. For this purpose, it was dipped for 20 seconds at 23°C. in 10 percent aqueous sodium hydroxide. Neutralization under these conditions took place to a depth of about 20 microns. Subsequently, the material was briefly washed and dried in air. The hydrophilic coating was characterized by a high surface hydrophilicity (wettability with water) and by a good resistance to abrasion and water. Q = 150 percent.

EXAMPLE 4

A copolymer comprising
30 parts of methyl methacrylate,
25 parts of n-butyl acrylate,
12 parts of β-hydroxy n-propylacrylate,
8 parts of N-(methoxy methylene)-methacrylamide, and
25 parts of methacrylic cid is prepared in 400 parts of ethanol according to the process described in Example 1 using 2 parts of t-butyl peroctoate. The Brookfield viscosity was 19 centipoises (spindle 1; 60 rpm; 20°c.). The $T_{\lambda\,max}$-value of a copolymer prepared from only the ester components (methyl methacrylate/butyl acrylate) is 39°C.

The polymer solution is combined with 4 parts of concentrated hydrochloric acid. As described under Example 1, an acrylate sheet is coated therewith and heated for 16 hours at 95°C. For a surface neutralization of the layer, the coated sheet is dipped for five seconds in a 1 percent aqueous sodium hydroxide solution at 23°C. Subsequently, the material is briefly washed and dried in air. In comparison with Example 3, the surface hydrophilicity is still greater, while resistance to abrasion and hardness are sufficient. Q = 180 percent.

EXAMPLE 5

A copolymer comprising:
30 parts of methylmethacrylate,
30 parts of methyl acrylate,
8 parts of β-hydroxy-n-propylacrylate,
5 parts of N-(methoxymethylene)-methacrylamide,
10 parts of N-dimethyl-N-(propyl-β-trimethoxysilane)-(β-methacryloxyethyl)-ammonium chloride (commercially available under the tradename "Z 6031," Dow Corning and
17 parts of N-trimethyl-β-methacryloxyethyl)-ammonium chloride is prepared using 1.5 parts of tert.-butyl peroctoate in 390 parts of ethanol and 10 parts of diacetone alcohol as in Example 1 with the difference that the polymerization temperature is held at 80°C. The Brookfield viscosity is 70 centipoises (spindle 1; 60 rpm; 20°C.). The $T_{\lambda\,max}$-value of a copolymer of 30 parts of methylmethacrylate and 30 parts of methylacrylate is 70°C.

The batch is diluted with 500 parts of ethylene glycol monomethyl ether into which 10 parts of concentrated sulfuric acid are stirred, and then is sprayed with a spray gun onto a glass plate. After 3 hours' drying in air, a highly adherent optically-flawless film is obtained which, in an appropriate thickness, satisfies strict anti-fogging requirements. The abrasion resistance and resistance to water is good. The swelling value, Q, is 200 percent.

EXAMPLE 6

A copolymer comprising:
53 parts of n-butyl-methacrylate,
15 parts of β-hydroxy-n-proplate,
10 parts of N-(isobutoxymethylene)-methacrylamide,
20 parts of N-trimethyl-(β-methacryloxyethyl)-ammonium chloride, and
2 parts of methacrylic acid is prepared as in Example 1 using 2.5 parts of tert. butyl peroctoate in 200 parts of n-butanol and 200 parts of isopropanol. The Brookfield viscosity is 17 centipoises (spindle 1; 60 rpm; 20°C.). The $T_{\lambda\,max}$-value of an n-butylmethacrylate homopolymer is 54°C.

The lacquer is applied to a polycarbonate sheet as described in Example 1, dried, and baked for 14 hours at 120°C. The film obtained has good abrasion resistance when moist, and at greater thicknesses, gives good anti-fogging protection. The swelling value, Q, is 80 percent.

EXAMPLE 7

A copolymer comprising:
40 parts of ethyl methacrylate,
20 parts of ethyl acrylate,
17 parts of N-trimethyl-($\beta$-methacryloxyethyl)-ammonium chloride,
12 parts of $\beta$-hydroxy-n-propylacrylate,
8 parts of N-(methoxymethylene) methacrylamide, and
3 parts of methacrylic acid is prepared using 2.5 parts of tert. butyl peroctoate in 400 parts of ethanol according to the method of Example 1 except that the reaction temperature is maintained at 80°C. The Brookfield viscosity is 13 centipoises (spindle 1; 60 rpm; 20°C.). The $T_{\lambda\ max}$-value of the ester component mixture (ethyl methacrylate/ethyl acrylate) is 63°C.

10 parts of concentrated sulfuric acid and 50 parts of methyl glycol, together with a few drops of an auxiliary film-forming agent (commercially available under the tradename "Raybo No. 3") are added to 500 parts of the polymer solution so obtained. An acrylic glass sheet is sprayed with the solution and dried in air. The film thickness is about 30 microns. The film obtained has properties similar to those in Example 2(a), but is more resistant to wiping because of the stronger cross-linking.

Swelling value: Q = 200 percent.

EXAMPLE 8

A solution comprising:
37 parts of methylmethacrylate,
37 parts of ethylacrylate,
13 parts of 2-chloracetoxyethyl methacrylate,
13 parts of 2-dimethylaminoethyl-methacrylate,
0.5 part of 2,2'-azo-bis-isobutyronitrile,
5 parts of glacial acetic acid,
200 parts of ethanol, and
100 parts of acetone
is held at the boiling point for 6 hours with stirring. After cooling to 20°C., the yellowish clear solution has a Brookfield viscosity of 30 centipoises (spindle 1; 60 rpm). The $T_{\lambda\ max}$-value of the ester compponent (b) (methylmethacrylate/ethylacrylate) is 55°C.

The solution is applied to glass by dipping and is dried slowly at a low temperature. The film obtained inhibits fogging under moderate humidity conditions.

Swelling value: Q = 30 percent.

EXAMPLE 9

A copolymer comprising:
35 parts of methylmethacrylate,
18 parts of n-butylacrylate,
10 parts of N-(methoxymethylene)-methacrylamide,
10 parts of methacrylamide,
5 parts of $\beta$-hydroxy-n-propylacrylate,
20 parts of methacrylic acid, and
2 parts of methacryloxypropyl-trimethoxysilane
is prepared according to Example 7 in 120 parts of ethanol and 280 parts of dioxane using 1.7 parts of tert.-butyl-peroctoate. The Brookfield viscosity of the polymer solution was 5,600 centipoises (spindle 3; 6 rpm; 20°C.). The $T_{\lambda\ max}$-value of the ester component (b) methylmethacrylate/n-butylacrylate) is 56°C. After dilution with 400 parts of ethanol and the addition of 5 parts of concentrated sulfuric acid, as well as a few drops of the auxiliary film-forming agent mentioned in Example 7, the solution is used to coat a glass plate by dipping. The film formed, which is about 50 microns thick, is dried and then baked for 5 hours at 100°C.

An anti-fogging effect is obtained according to choice by the following three techniques: (a) dipping in 1 percent NaOH for 15 seconds; (b) dipping in 2 percent ammonia solution for five seconds; (3) dipping in dimethylethanolamine for 10 minutes.

The best anti-fogging protection is given by technique (a) (the swelling value, Q, is 100 percent). Technique (b) leads to a temporary anti-fogging protection, while (c) gives the weakest anti-fogging effect but produces good resistance to abrasion.

EXAMPLE 10

A copolymer comprising:
38 parts by weight of methylacrylate,
23 parts of methylmethacrylate,
17 parts of N-trimethyl-($\beta$-methacryloxyethyl)-ammonium chloride,
20 parts of $\beta$-hydroxyethyl-methacrylate, and
2 parts of methacrylic acid
is prepared in 400 parts of ethanol as in Example 7 using 1.5 parts of tert.-butyl peroctoate. The Brookfield viscosity of the polymer solution is 23 centiposes (spindle 1; 60 rpm; 20°c.). The $T_{\lambda\ max}$-value of the ester component mixture (b) (methylacrylate/methylmethacrylate) alone is 67°C.

The polymerization batch is mixed with 100 parts of ethylene glycol monomethyl ether, 5 parts of concentrated sulfuric acid, and 10 parts of hexamethoxymethylene melamine, applied to a polycarbonate plate by dipping, and baked for 5 hours at 80°C. A layer having high abrasion resistance but relatively small anti-fogging effect, is obtained.

The swelling value, Q, is about 50 percent.

EXAMPLE 11

A copolymer comprising:
25 parts of methylmethacrylate,
8 parts of n-butylacrylate,
5 parts of styrene,
20 parts of methacrylic acid,
15 parts of N-(methoxymethylene) methacrylamide,
10 parts of $\beta$-hydroxy-n-propylacrylate,
15 parts of methacrylamide, and
2 parts of methacryloxypropyl trimethoxysilane
is prepared in 120 parts of ethanol and 280 parts of dioxane using 1.5 parts of tert.-butyl peroctoate. The Brookfield viscosity of the polymer solution is 3000 centipoises (spindle 1; 6 rpm; 20°C.). The $T_{\lambda\ max}$-value of the ester component (b) (methylmethacrylate/n-butylacrylate/styrene) is 80°C.

The polymer solution is diluted as in Example 9 and used to form a hydrophilic coating on a glass plate. The film, baked for 5 hours at 100°C., is given a surface treatment with 1 percent aqueous sodium hydroxide for 15 seconds at 20°C. The now-hydrophilic coating shows an adequate anti-fogging effect combined with good abrasion resistance.

Q = 70 percent.

EXAMPLE 12

A copolymer comprising:
48 parts of n-butylmethacrylate,
16 parts of $\beta$-hydroxyethyl-methacrylate, 11 parts of N-(isobutoxymethylene)-methacrylamide, and 25 parts of β-dimethylamino-ethylmethacrylate is prepared according to Example 1 in 200 parts of isobutanol and 200 parts of ethylene glycol monoisopropyl ether using 1.5 parts of tert.-butyl peroctoate. The Brookfield viscosity of the polymer solution is 30 centipoises (spindle 1; 30 rpm; 20°C.). The $T_{\lambda\ max}$-value of the ester component (n-butylmethacrylate) is 54°C.

A polycarbonate sheet is coated by dipping and is baked for 14 hours at 140°C. The coating obtains its hydrophilic character by a surface treatment comprising dipping in 1 percent sulfuric acid for three minutes at 20°C. The coating is now fog-free under moderate humidity conditions and shows a good resistance to wiping. Q = 30 percent.

What is claimed:

1. The method of forming an anti-fogging coating on an optical surface which comprises applying a solution of a hydrophilic film-forming resin in an aliphatic alcohol having from 1 – 4 carbon atoms to said surface to form a coating thereon and drying and hardening said coating at temperatures up to 160°C., wherein said hydrophilic resin comprises a. 12 – 30 percent of an ethylenically unsaturated polymerizable carboxylic acid having from 3 to 5 carbon atoms, or an alkali metal or ammonium salt thereof, or of a compound of the formulas

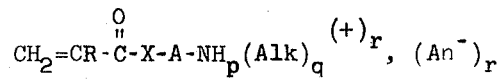

or

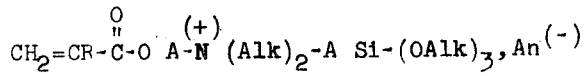

wherein R is hydrogen or methyl, X is oxygen or —NH, A is alkylene having 2 to 4 carbon atoms, Alk is alkyl having 1 to 18 carbon atoms, An⁻ is one equivalent of an anion, $p = 0$, 1, or 2, $r = 0$ or 1, and $q = 2 + r - p$, b. 40 – 88 percent of an acrylic acid ester or methacrylic acid ester of an aliphatic monoalcohol having from 1 – 4 carbon atoms or of a mixture of such alcohols, wherein a polymer or copolymer formed from the ester or ester mixture has a $T_{\lambda\ max}$-value between 30°C. and 80°C., and c. 0 – 50 percent of a cross linking agent selected from the group consisting of (1) methylol compounds and methylol ethers of acrylamide or of methacrylamide; (2) mixtures of the compounds (1) above with an hydroxyalkyl ester of acrylic acid or methacrylic acid having from 2 – 6 carbon atoms in the hydroxy alkyl portion thereof, or with acrylamide or methacrylamide and (3) hydroxyalkyl esters as in (2) above in combination with an etherified amine-formaldehyde resin, including the step of neutralizing salt-forming groups, if they are present in component (a), with alkali metal hydroxides or ammonia if the salt-forming groups are carboxyl groups or with an acid if the salt-forming groups are tertiary or quaternary amino groups in an aminoalkyl ester component of the hydrophilic polymer, said resin, in the form of a layer from 30 to 50 microns thick swelling in water at 20°C. within three minutes to a volume 20 percent to 300 percent greater than its original volume.

2. A method as in claim 1 wherein component (b) of said resin additionally comprises up to 10 percent, by weight of the resin, of a further comonomer selected from the group consisting of esters of acrylic and methacrylic acid having more than 4 carbon atoms in the alcohol portion thereof, styrene, acrylonitrile, and methacrylonitrile.

3. A method as in claim 1 wherein a compound of the formula

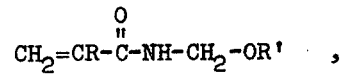

wherein R is hydrogen or methyl and R' is hydrogen or alkyl is present in component (c) of said resin.

4. A method as in claim 3 wherein said compound is present in combination with acrylic acid, methacrylic acid, hydrochloric acid, acrylamide, methacrylamide, or an hydroxyalkyl ester of acrylic or methacrylic acid.

5. The method as in claim 1 wherein component (a) of said resin comprises basic salt-forming groups and said coating is neutralized with an acid after formation thereof.

6. The method as in claim 1 wherein compound (a) of said resin comprises acidic salt-forming groups and said coating is neutralized with a base after formation thereof.

7. An optical surface having thereon an anti-fogging coating of a hydrophilic film-forming resin prepared by the method of claim 1.

* * * * *